(12) United States Patent
Faruque et al.

(10) Patent No.: US 10,099,639 B1
(45) Date of Patent: Oct. 16, 2018

(54) ENERGY ABSORBING DEVICE

(71) Applicant: Ford Global Technologies, LLC, Dearborn, MI (US)

(72) Inventors: Mohammad Omar Faruque, Ann Arbor, MI (US); James Chih Cheng, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/596,238

(22) Filed: May 16, 2017

(51) Int. Cl.
*B60R 19/18* (2006.01)
*B60R 19/02* (2006.01)

(52) U.S. Cl.
CPC ............ *B60R 19/18* (2013.01); *B60R 19/023* (2013.01); *B60R 2019/186* (2013.01); *B60R 2019/1886* (2013.01)

(58) Field of Classification Search
CPC ..... B60R 19/16; B60R 19/18; B60R 2019/18; B60R 2019/186; B60R 2019/1873
USPC .......... 293/107–109, 120–121, 132
See application file for complete search history.

(56) References Cited

U.S. PATENT DOCUMENTS

| | | | |
|---|---|---|---|
| 4,101,704 A | 7/1978 | Hiles | |
| 6,334,639 B1 | 1/2002 | Vives et al. | |
| 7,393,030 B2 | 7/2008 | Steeg et al. | |
| 7,980,606 B2 | 7/2011 | Takahashi et al. | |
| 9,376,074 B2 | 6/2016 | Hundley et al. | |
| 2005/0087998 A1* | 4/2005 | Curry .................... | B60R 19/205 293/107 |
| 2006/0255601 A1* | 11/2006 | Tamada .................. | B60R 19/18 293/102 |
| 2013/0257069 A1* | 10/2013 | Roberts .................. | B60R 19/22 293/120 |
| 2016/0347270 A1 | 12/2016 | Higashimachi | |

FOREIGN PATENT DOCUMENTS

DE    102011051442 A1    1/2013

* cited by examiner

*Primary Examiner* — Dennis H Pedder
(74) *Attorney, Agent, or Firm* — Frank A. MacKenzie; Bejin Bieneman PLC

(57) ABSTRACT

An energy absorbing device includes a tube. A plurality of first pellets are disposed in the tube and a plurality of second pellets are disposed in the tube. The first pellets are deformable relative to the second pellets.

19 Claims, 9 Drawing Sheets

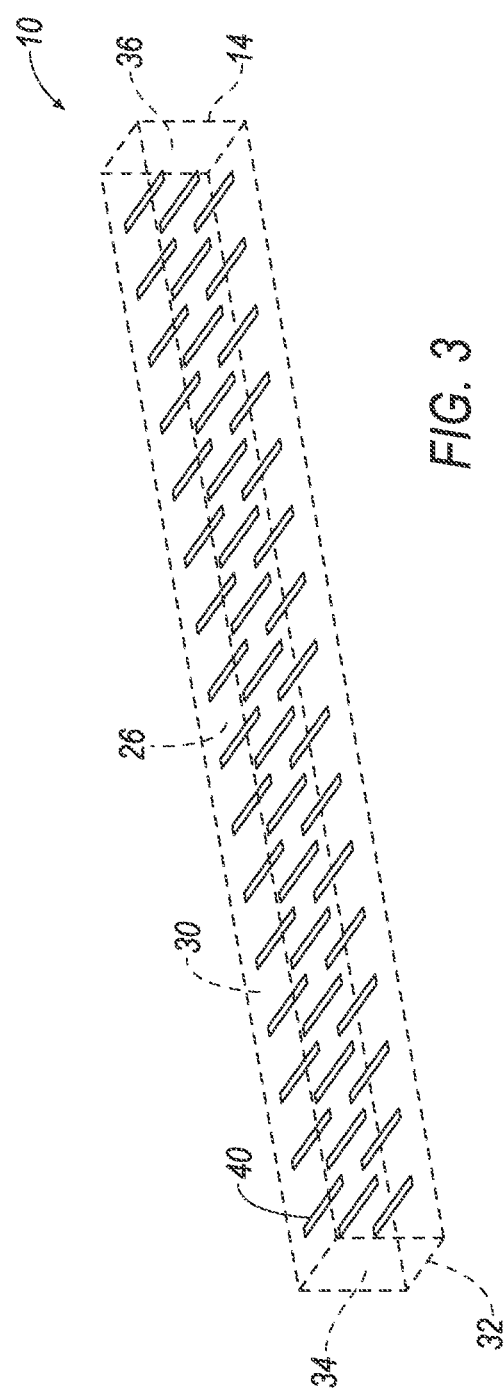

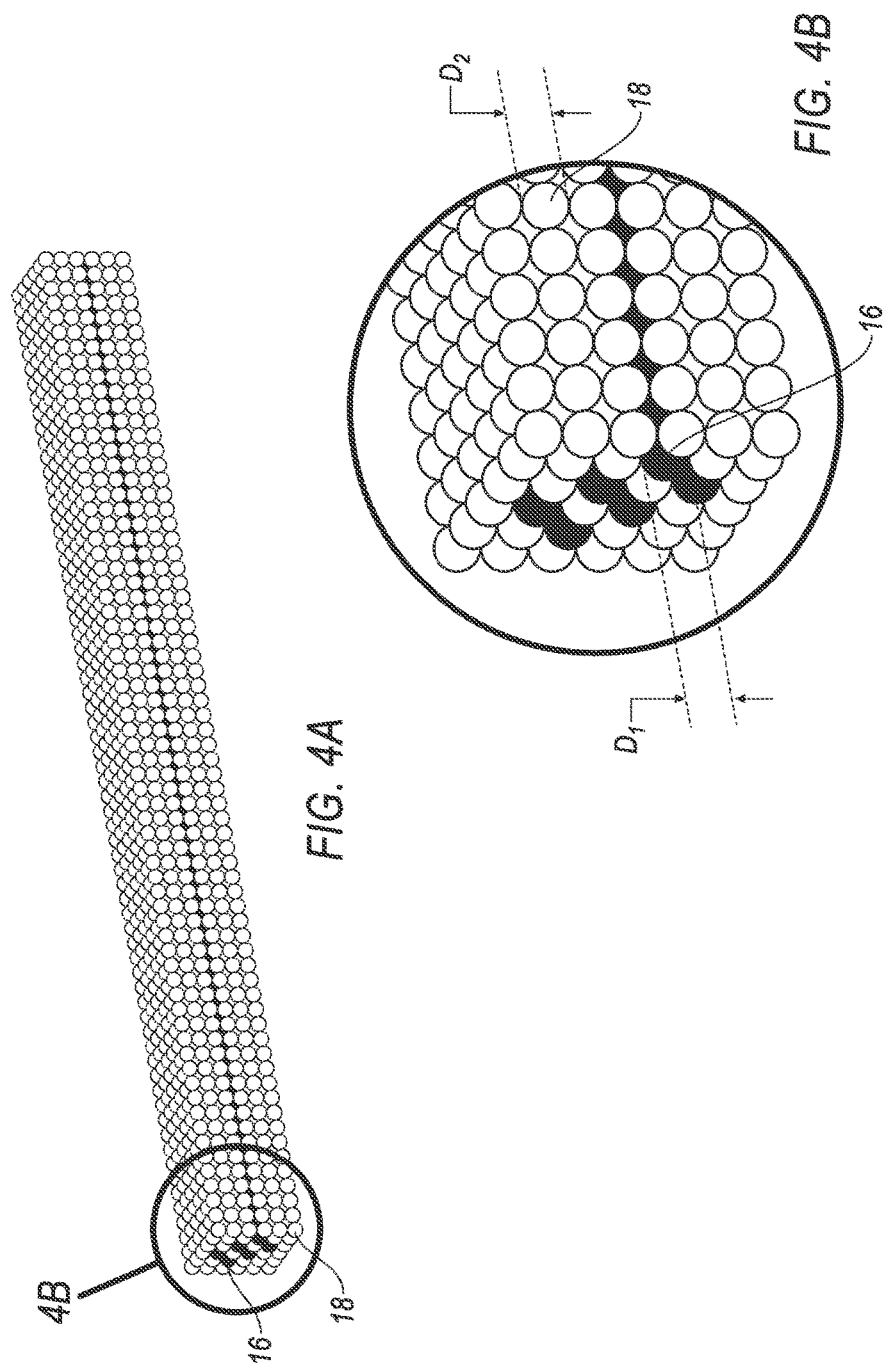

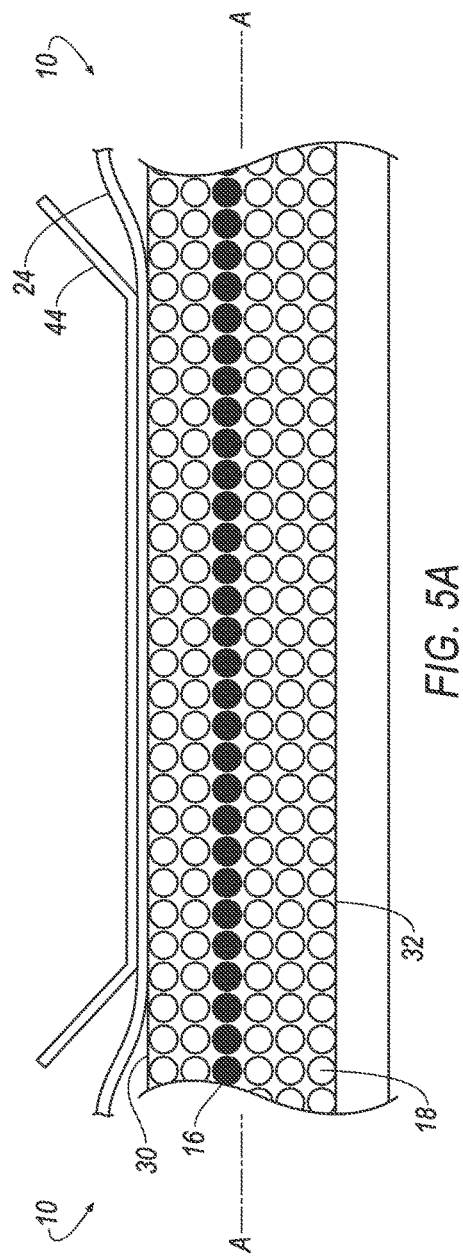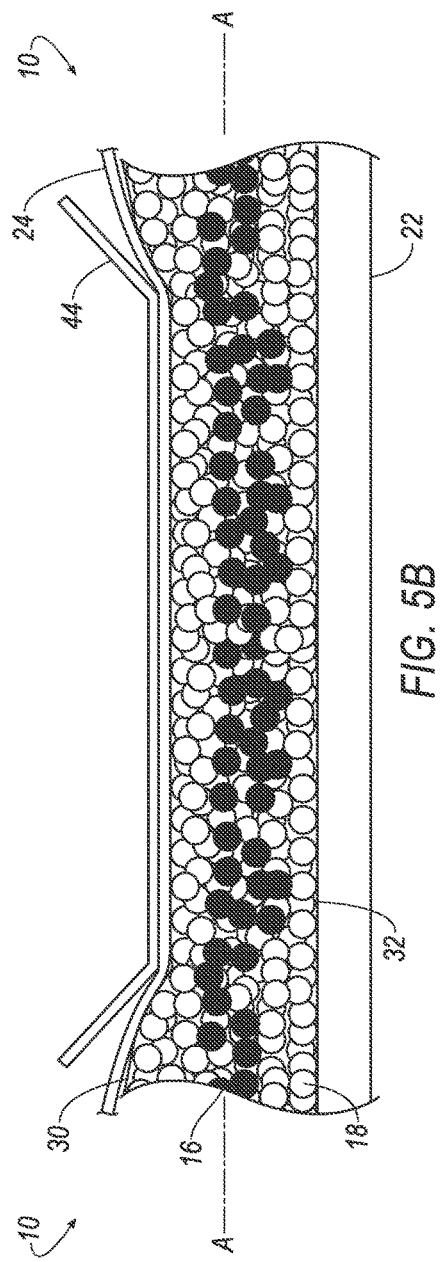
FIG. 5A
FIG. 5B

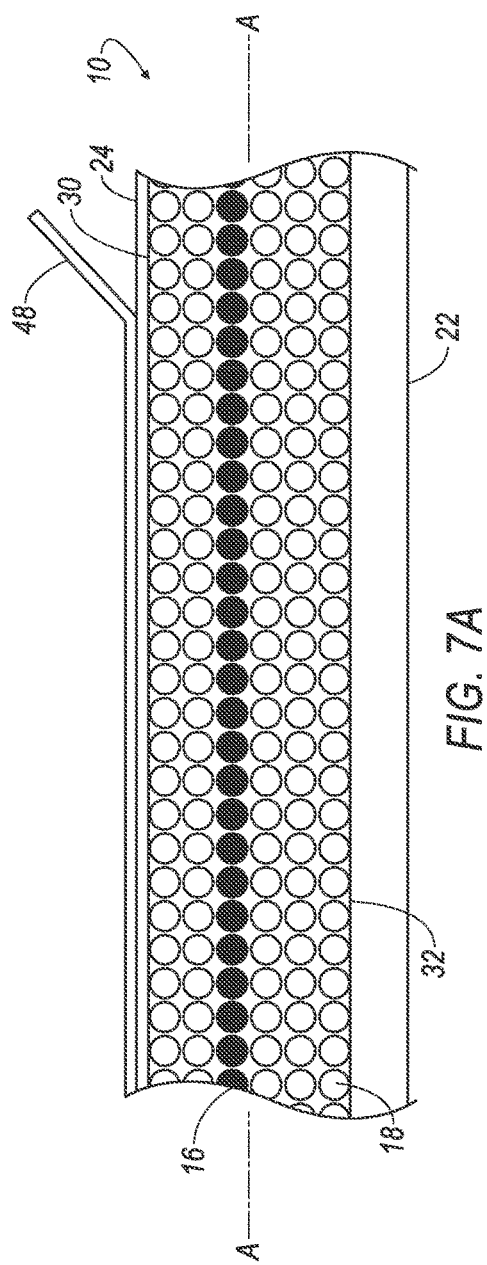
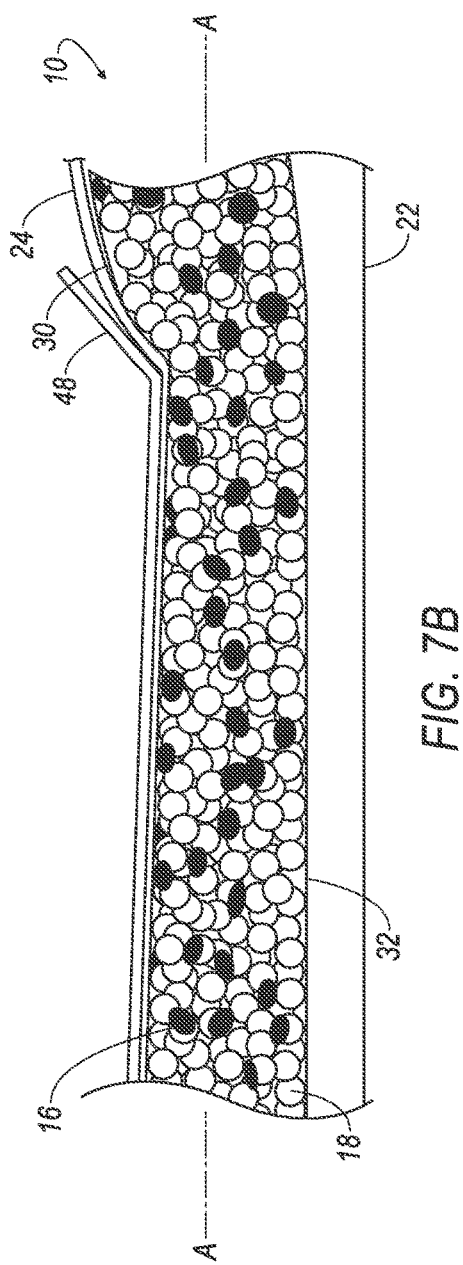

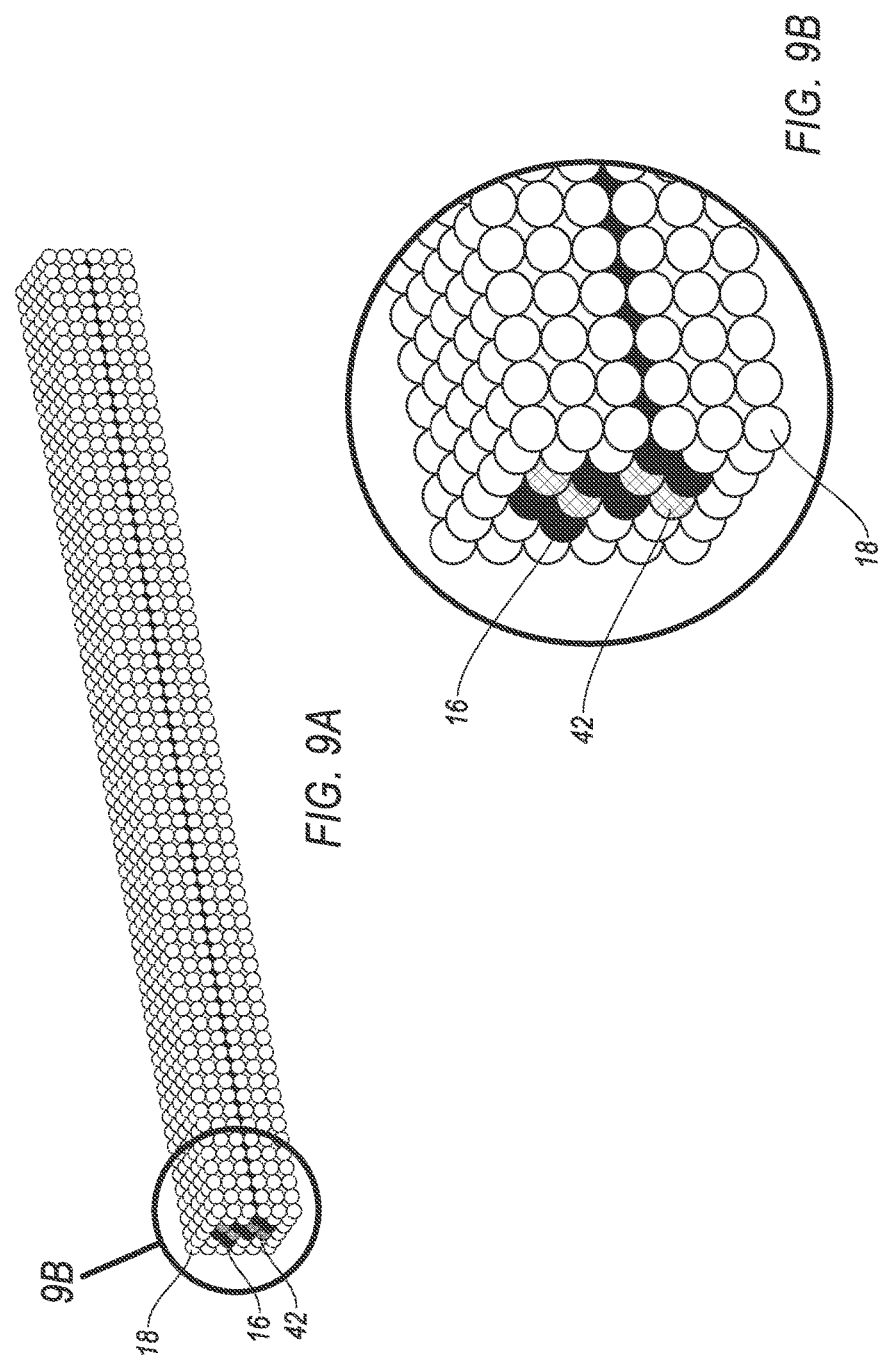

ENERGY ABSORBING DEVICE

BACKGROUND

Vehicle bumpers may have a stiffness determined by the material and structure of the bumper. However, the desired stiffness of the bumper may be different depending on vehicle speed. For example, at a low vehicle speed, a higher stiffness may be desired to prevent damage to the bumper, while at a high vehicle speed, a lower stiffness may be desired to absorb energy during a pedestrian or vehicle impact.

Several vehicle research organizations release test protocols and standards for vehicles directed to specific outcomes. For example, the Research Council for Automobile Repairs (RCAR) releases impact test protocols and standards for vehicles. One example RCAR impact test protocol is directed toward low speed damageability (LSD), i.e., damage to vehicle component at 15 kilometers per hour (kph). In another example, the National Highway Traffic Safety Administration (NHTSA) releases the Federal Motor Vehicle Safety Standards (FMVSS) Part 581, which describes impact test protocols for LSD of vehicle bumper systems. However, as described above, the stiffness of the bumper system for LSD may differ from the stiffness desired for pedestrian protection. For example, the European New Car Assessment Programme (EURO NCAP) protocols for upper leg impact at 40 kph and lower leg impact at 40 kph may be benefited by a lower stiffness for the bumper in comparison to the stiffness desired for FMVSS protocols for LSD. In other words, requirements for LSD and pedestrian protection may create competing design principles. There remains an opportunity to design a vehicle bumper that accounts for low speed damageability, pedestrian impact, and high speed vehicle impact.

BRIEF DESCRIPTION OF THE DRAWINGS

FIG. 3 is a perspective view of a tube of the energy absorbing device.

FIG. 4A is a perspective view of a plurality of first pellets and a plurality of second pellets.

FIG. 4B is a magnified view of FIG. 4A.

FIG. 5A is a cross-sectional view of the energy absorbing device prior to an impact.

FIG. 5B is the cross-sectional view of FIG. 5A during the impact.

FIG. 7A is a cross-sectional view of the energy absorbing device prior to another type of impact.

FIG. 7B is the cross-sectional view of FIG. 7A during the impact.

FIG. 9A is a perspective view of a plurality of third pellets arranged with the plurality of first pellets and the plurality of second pellets.

FIG. 9B is a magnified view of FIG. 9A.

DETAILED DESCRIPTION

Figure 1:
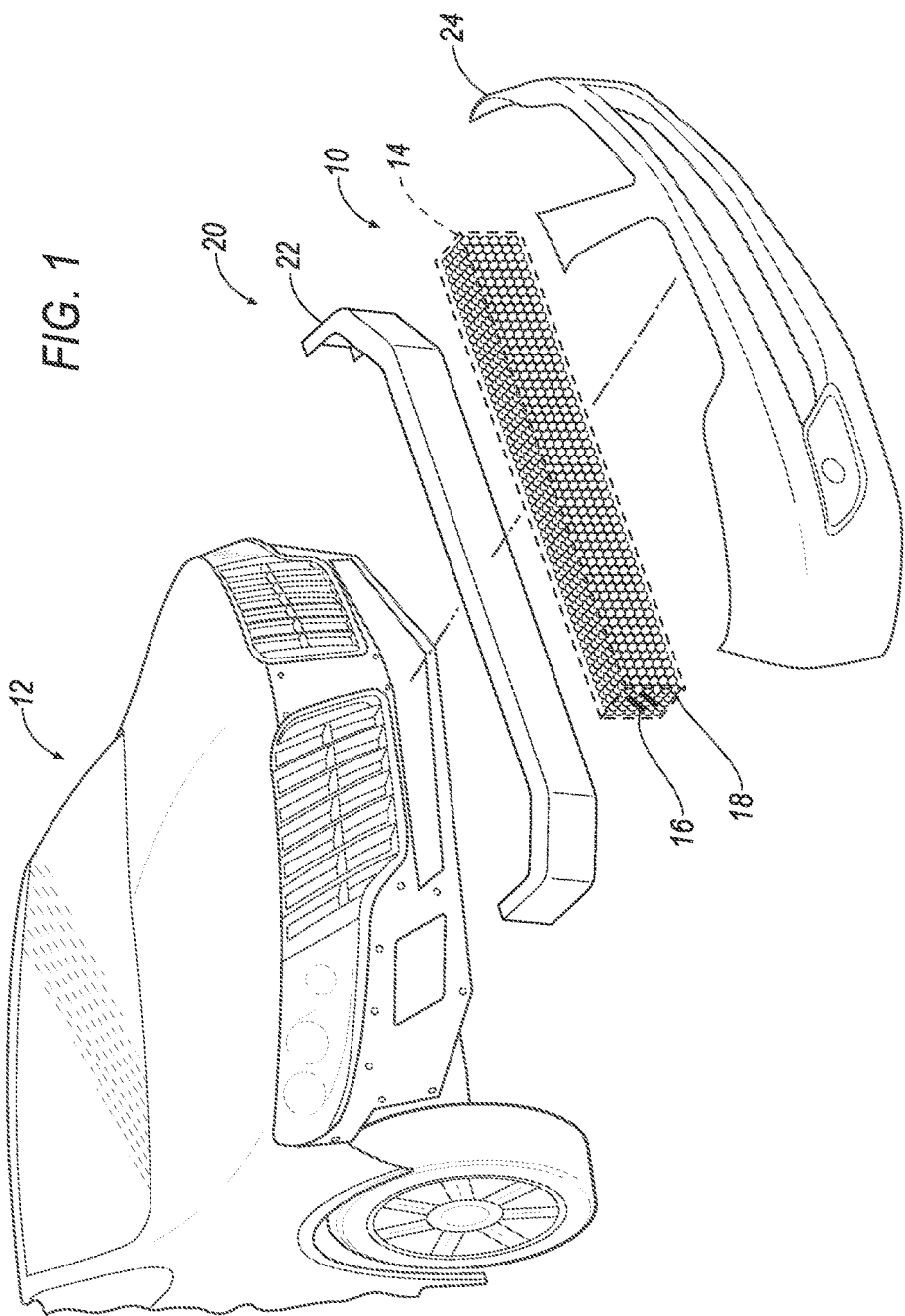
FIG. 1 is an exploded view of a vehicle including a bumper assembly including an energy absorbing device.

An energy absorbing device includes a tube. A plurality of first pellets are disposed in the tube. A plurality of second pellets are disposed in the tube. The first pellets are deformable relative to the second pellets.

The plurality of first pellets may be distributed throughout the plurality of second pellets.

The first pellets and the second pellets may be sphere-shaped.

The first pellets may be arranged in layers and the second pellets may be arranged in layers, and the layers of the first pellets and the layers of the second pellets may be arranged in alternative arrangement.

The tube may include a pair of opposing lateral sides. The lateral sides may be spaced from each other. The tube may include a pair of intermediate sides. The intermediate sides may be spaced from each other. The intermediate side may extend between the lateral sides. The tube may include a plurality of tethers connecting the pair of opposing lateral sides.

The first pellets may be distributed along a length of the tube. The first pellets may be arranged along a center axis extending along a length of the tube.

The tube may define a volume. The tube may be designed to deform the first pellets when the tube is deformed to decrease the volume of the tube.

The energy absorbing device may include a plurality of third pellets. The third pellets may be deformable relative to the first pellets and the second pellets.

A diameter of each of the first pellets may be substantially equal to a diameter of each of the second pellets.

The tube may be substantially rectangularly shaped.

The tube may include a pair of opposing axial ends. The tube may be designed to deform the first pellets and move the second pellets toward the axial ends when the tube is deformed. The first pellets may be designed to deform and to allow the second pellets to move toward the axial ends.

The first pellets and the second pellets may be arranged to slide past each other.

A bumper assembly includes a bumper beam and a tube. The tube is supported by the bumper beam. The bumper assembly includes a plurality of first pellets disposed in the tube and a plurality of second pellets disposed in the tube. The first pellets are deformable relative to the second pellets.

In the bumper assembly, the plurality of first pellets may be distributed throughout the plurality of second pellets.

In the bumper assembly, the first pellets may be arranged along a center axis extending along a length of the tube.

In the bumper assembly, the tube may define a volume. The tube may be designed to deform the first pellets when the tube is deformed to decrease the volume of the tube.

In the bumper assembly, the tube may include a pair of opposing axial ends. The tube may be designed to deform the first pellets and move the second pellets toward the axial ends when the tube is deformed.

The bumper assembly may further include a fascia spaced from the bumper beam. The tube may be disposed between the bumper beam and the fascia.

With reference to the Figures, wherein like numerals indicate like parts throughout the several views, an energy absorbing device 10 in a vehicle 12 includes a tube 14. A plurality of first pellets 16 are disposed in the tube 14. A plurality of second pellets 18 are disposed in the tube 14. The first pellets 16 are deformable relative to the second pellets 18.

Upon receiving an impact, the first pellets 16 and the second pellets 18 may provide a variable stiffness for the energy absorbing device 10 depending on a width of an impactor along a central axis A of the energy absorbing device 10. A width of the impactor for a low-speed vehicle impact, e.g., simulated by the RCAR LSD and the FMVSS Part 581 may be about 5-6 times higher than a width of an impactor for a pedestrian leg impact. The energy absorbing device 10 may deform less along an impact axis B in RCAR and LSD impact modes than during a pedestrian impact mode. Therefore, the energy absorbing device 10 may reduce deformation along the impact axis B to components of the vehicle 12 (e.g., a fascia 24). Furthermore, during the pedestrian impact, e.g., simulated by the Euro NCAP lower leg impact and upper leg impact, deformation of the energy absorbing device 10 along the central axis A may be greater than during the LSD impact because the width of the pedestrian leg impactor may be narrower compared to RCAR and LSD. The greater deformation along the central axis A may result in a lower average impact force. The energy absorbing device 10 may thus have a variable stiffness based on a magnitude of a force applied at the point of impact and the size and shape of the object being impacted.

Figure 2:
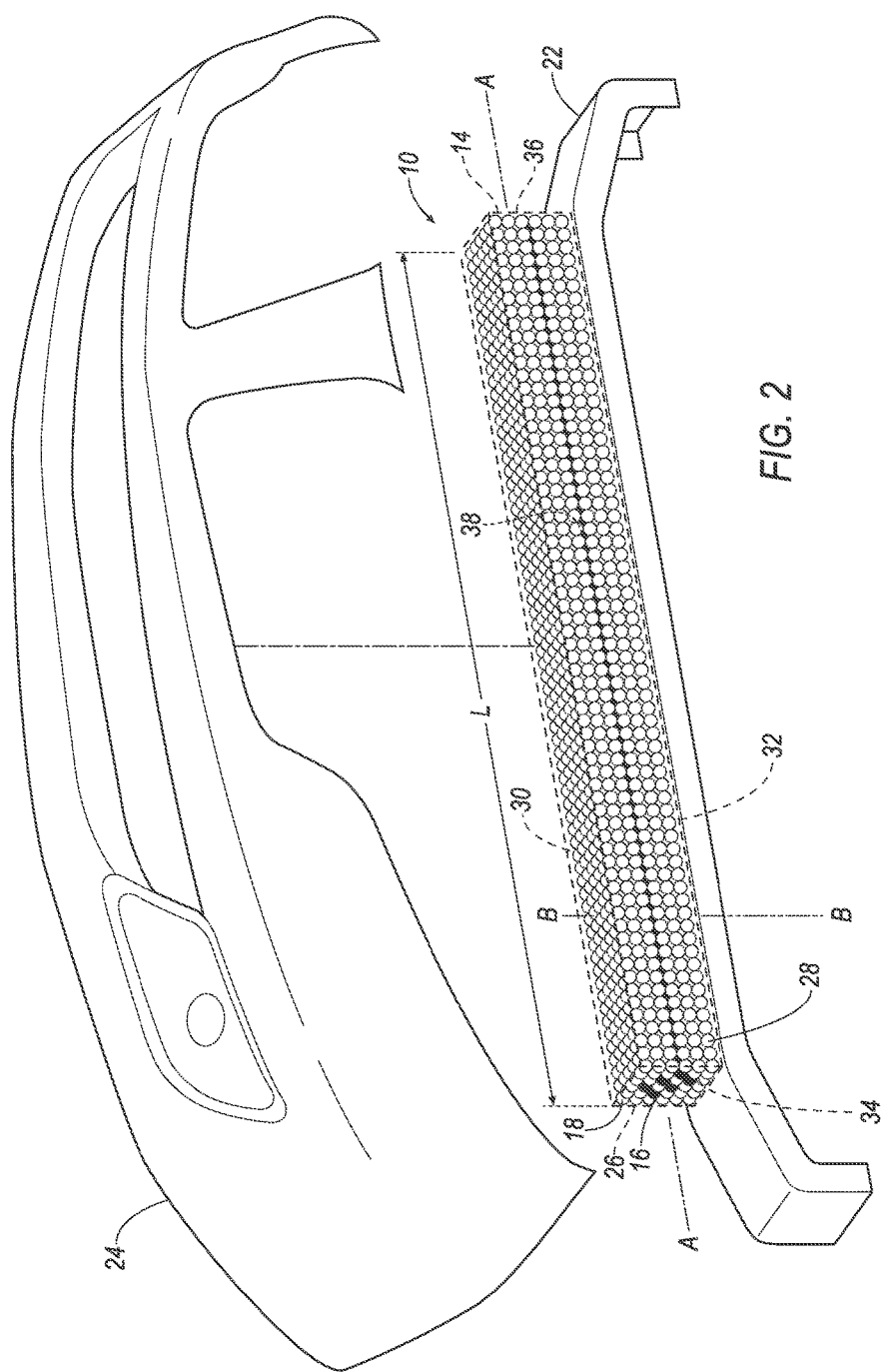
FIG. 2 is a perspective view of the bumper assembly.

As shown in FIG. 1, the vehicle 12 includes a bumper assembly 20. The bumper assembly 20 may absorb energy during an impact. The bumper assembly 20 includes a bumper beam 22 and the tube 14. The tube 14 is supported by the bumper beam 22, as shown in FIG. 2. The tube 14 may be connected to the bumper beam 22 in any suitable fashion, e.g., fasteners, brackets, welding, adhesive, etc.

The bumper assembly 20 may include the fascia 24, as shown in FIG. 1. The fascia 24 may be a portion of an exterior of the vehicle 12. The fascia 24 may be supported by the bumper beam 22. The fascia 24 may be spaced from the bumper beam 22. The tube 14 may be disposed between the bumper beam 22 and the fascia 24. The tube 14 may abut the fascia 24. Alternatively, the tube 14 may be spaced from the fascia 24. The fascia 24 may be attached to a body (not numbered) and/or to the bumper beam 22.

The fascia 24 may be flexible and/or brittle relative to the energy absorbing device 10, and the tube 14 may be flexible relative to the bumper beam 22. During the vehicle impact, the energy absorbing device 10 reinforces the fascia 24. Specifically, as the fascia 24 is deformed by the impact, the energy absorbing device 10 acts against the direction of impact. Accordingly, as set forth below, the energy absorbing device 10 resists deformation to the fascia 24 that would result in plastic deformation of the fascia 24 during a low-speed impact.

The tube 14 may be, for example, substantially rectangularly shaped, as shown in FIGS. 1-3 and 5A-7B. The tube 14 may include a pair of opposing lateral sides, including a first lateral side 26 and a second lateral side 28 as shown in FIGS. 2-3. The lateral sides 26, 28 may be spaced from each other. The tube 14 may include a pair of intermediate sides, including a first intermediate side 30 and a second intermediate side 32 as shown in FIGS. 2-3 and 5A-7B. The intermediate sides 30, 32 may be spaced from each other and may extend between the lateral sides 26, 28. The tube 14 may include a pair of opposing axial ends, including a first axial end 34 and a second axial end 36 as shown in FIGS. 2-3.

As shown in FIG. 2, The tube 14 may define a length L between the first axial end 34 and the second axial end 36. The tube 14 may define the central axis A extending from the first axial end 34 to the second axial end 36. The tube 14 may define the impact axis B transverse to the central axis A extending from the first intermediate side 30 to the second intermediate side 32.

The tube 14 may define a volume 38. The volume 38 may be enclosed by the lateral sides 26, 28, the intermediate sides 30, 32, and the axial ends 34, 36. During the vehicle impact, the tube 14 is designed to deform relative to the bumper beam 22. When the tube 14 deforms, the first pellets 16 may deform to decrease the volume 38 of the tube 14. A volume proportion of the first pellets 16 with respect to the overall volume 38 of the tube 14 containing the first pellets 16 and the second pellets 18 may be a proportion of the maximum volume of the tube 14 that may change during an impact. For a volume fraction of the first pellets 16, the deformation of the tube 14 along the central axis A may reduce as a width of the impactor increases.

The tube 14 may include a plurality of tethers 40, as shown in FIG. 3. The tethers 40 may connect the lateral sides 26, 28 of the tube. The tethers 40 may extend between the first lateral side 26 and the second lateral side 28. During the vehicle impact, the tethers 40 may reduce movement of the lateral sides 26, 28, increasing movement of the intermediate sides 30, 32 and directing more impact energy to the first pellets 16 and the second pellets 18. The tethers 40 may be constructed of a flexible material, e.g., a polymer, a fabric, etc., that is flexible relative to the lateral sides 26, 28.

The energy absorbing device 10 includes the plurality of first pellets 16, as shown in FIGS. 1-2 and 4A-9B. The first pellets 16 are disposed in the tube 14. The first pellets 16 may absorb energy during the vehicle impact. The first pellets 16 are designed to deform to absorb energy from the vehicle impact. While only one of the first pellets 16 may be referenced in the Figures, all pellets in the Figures that have the same shading as the identified first pellet 16 are included in the plurality of first pellets 16.

The energy absorbing device 10 includes the plurality of second pellets 18, as shown in FIGS. 1-2 and 4A-9B. The second pellets 18 are disposed in the tube 14. While only one of the second pellets 18 may be referenced in the Figures, all pellets in the Figures that have the same shading as the identified second pellet 18 are included in the plurality of second pellets 18.

The plurality of first pellets 16 may be distributed throughout the plurality of second pellets 18. As used herein, the first pellets 16 are "distributed" throughout the second pellets 18 when at least one of the first pellets 16 is disposed between at least two of the second pellets 18.

Figure 8:
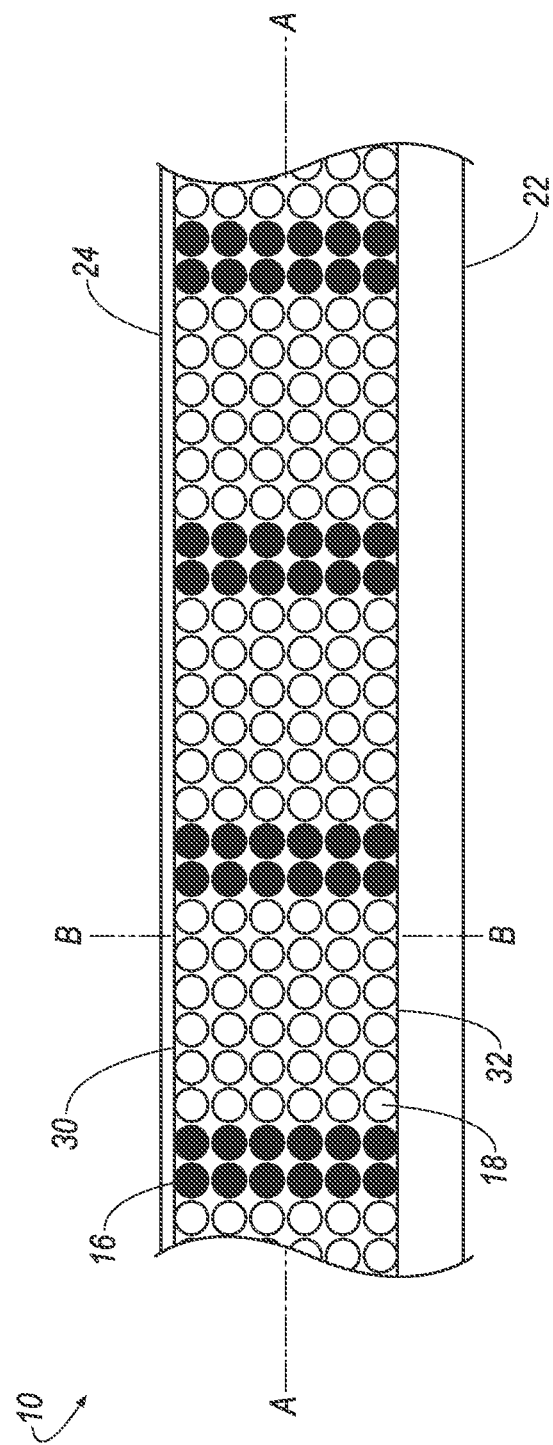
FIG. 8 is a cross-sectional view of the plurality of the first pellets and the plurality of second pellets arranged in alternating layers.

The first pellets 16 may be distributed throughout the second pellets 18 in a plurality of distributions. The first pellets 16 and the second pellets 18 may be arranged in a pattern. As one example, the first pellets 16 may be positioned in the tube 14 in a substantially even distribution along the length L of the tube 14 throughout the second pellets 18, as shown in FIGS. 1-2, 4A-7B, and 9. In other words, the first pellets 16 and the second pellets 18 may be arranged in a constant pattern from the first axial end 34 to the second axial end 36. As another example, the first pellets 16 may be distributed in layers alternating with layers of the second pellets 18 as shown in FIG. 8. In other words, the first pellets 16 and the second pellets 18 may be arranged in a repeating pattern that repeats from the first axial end 34 to the second axial end 36. As another example, the first pellets 16 may be randomly distributed throughout the second pellets 18.

The first pellets 16 may be distributed along the length L of the tube 14. The first pellets 16 may be arranged along the center axis A of the tube 14. As shown in FIGS. 4A-7B, the first pellets 16 may be disposed in a plurality of lines along the center axis A that extend along the length L of the tube 14. By arranging the first pellets 16 along the center axis A, the first pellets 16 may absorb impact energy for impacts that occur along the length L. The first pellets 16 may be distributed in any suitable pattern along the length L of the tube 14, e.g., in a continuous line, in periodic groupings, in layers, etc. The first pellets 16 may be evenly distributed along the length L of the tube 14. Alternatively, the first pellets 16 may be unevenly distributed, e.g., more of the first pellets 16 may be disposed toward a center of the length L of the tube 14 and fewer of the first pellets 16 may be disposed toward the axial ends 34, 36 of the tube 14.

Figure 6A:
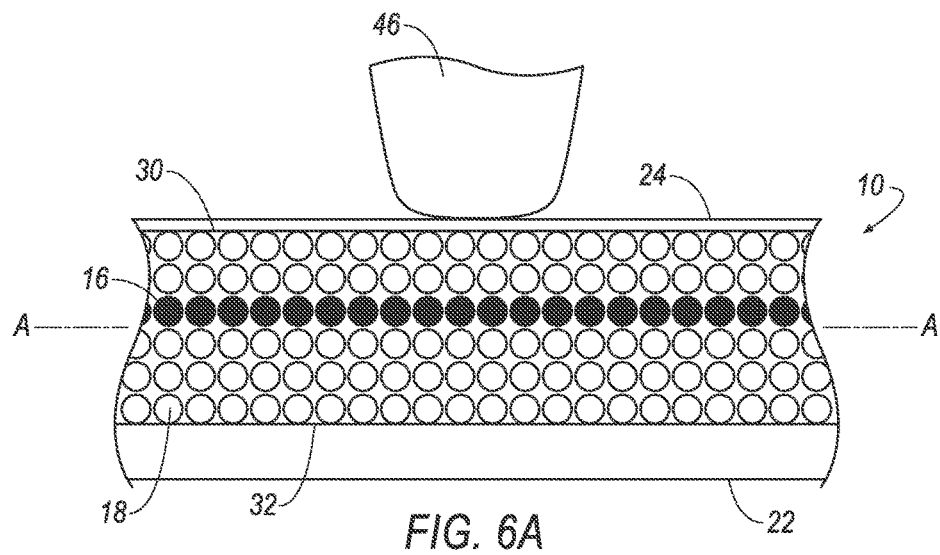
FIG. 6A is a cross-sectional view of the energy absorbing device prior to another type of impact.
Figure 6B:
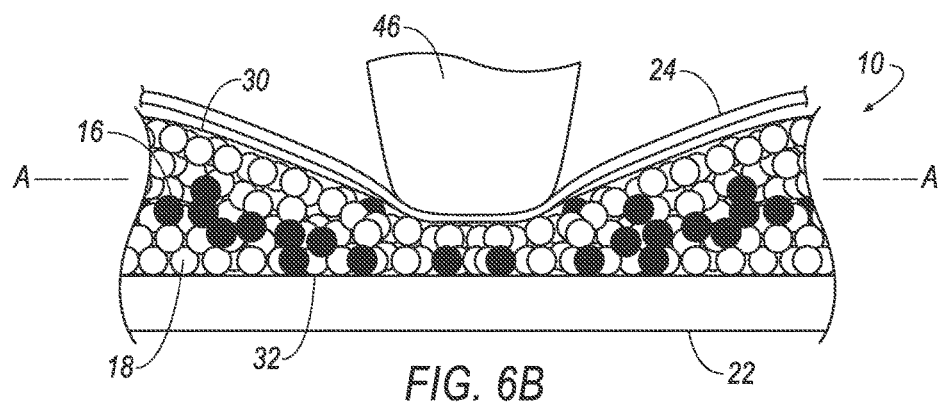
FIG. 6B is the cross-sectional view of FIG. 6A during the impact.

Prior to the impact, as shown in FIGS. 5A, 6A, and 7A, the first pellets 16 may be distributed along the center axis A. During the impact, as shown in FIGS. 5B, 6B, and 7B, the first pellets 16 may move away from their previous arrangement along the center axis A, clustering along a plurality of locations along the length L.

The first pellets 16 may be arranged in layers in the tube 14, as shown in FIG. 8. As used herein, a "layer" of the first pellets 16 is an arrangement of the first pellets 16 that extends from the first intermediate side 30 to the second intermediate side 32 along the impact axis B. As one example, the second pellets 18 may be arranged in layers in the tube 14 spaced from each other along the impact axis B, as shown in FIG. 8. Alternatively, the layers of the first pellets 16 and the layers of the second pellets 18 may be arranged in other arrangements. Along the length L of the tube, each of the layers of the first pellets 16 may be disposed between two of the layers of the second pellets 18.

The first pellets 16 and the second pellets 18 may be sphere-shaped. Each of the first pellets 16 and the second pellets 18 may define a diameter, shown in FIG. 4B as $D_1$ for the first pellets 16 and $D_2$ for the second pellets 18. The diameter may be a distance between two antipodal points on one of the first pellets 16 and the second pellets 18. The diameter may be substantially similar for all antipodal points on each of the first pellets 16 and the second pellets 18. The diameter $D_1$ of each of the first pellets 16 may be substantially equal to the diameter $D_2$ of each of the second pellets 18.

The first pellets 16 and the second pellets 18 may be formed of the same type of material or a different type of material, but in any event, the first pellets 16 are deformable relative to the second pellets 18. The first pellets 16 and/or the second pellets 18 may be formed of foam, polymer, metal, etc.

The first pellets 16 may be constructed of a first material that may deform upon impact, e.g., a foam, an elastic polymer, a metal, etc. The second pellets 18 may be constructed of a second material that may resist deformation upon impact, e.g., a rigid polymer, a metal, etc. The first material may have a first deformation strength, e.g., an elastic modulus, a tensile strength, etc., and the second material may have a second deformation strength greater than the first deformation strength. As one example, the first material may be a polystyrene foam having an elastic modulus of about 100 megapascals (MPa), and the second material may be polyvinyl chloride having an elastic modulus of about 3000 MPa. Because the elastic modulus of polyvinyl chloride is greater than the elastic modulus of the polystyrene foam, the first pellets 16 constructed of the polystyrene foam may be deformable relative to the second pellets 18 constructed of the polyvinyl chloride.

As shown in FIGS. 9A-9B, the energy absorbing device may include a plurality of third pellets 42. The third pellets 42 may be deformable relative to the first pellets 16 and to the second pellets 18. The third pellets 42 may be constructed of a material having a deformation strength that is between the deformation strength of the first pellets 16 and the deformation strength of the second pellets 18. Alternatively, the third pellets 42 may be constructed of a material having a deformation strength that is lower (i.e., less resistant to deformation) that the deformation strength of the first pellets 16 and the second pellets 18. By incorporating the third pellets 42, the energy absorbing device 10 may have a varied stiffness that allows for more customized energy absorbing characteristics.

The third pellets 42 may be arranged along the center axis A of the tube 14, as shown in FIGS. 9A-9B. The third pellets 42 may be disposed in a plurality of lines along with the first pellets 16. The third pellets 42 may be distributed along the center axis A such that the third pellets 42 may absorb energy from an impact at a plurality of positions along the length L of the tube 14. Alternatively, while not shown in the Figures, the third pellets 42 may be arranged in layers among layers of the first pellets 16 and the second pellets 18. In another alternative, the third pellets 42 may be distributed randomly throughout the first pellets 16 and the second pellets 18. As described above in reference to the first pellets 16, the third pellets 42 may be distributed in any suitable pattern along the length L of the tube 14, e.g., in a continuous line, in periodic groupings, in layers, etc.

Upon receiving the impact, the first pellets 16 and the second pellets 18 may move in the tube 14 to absorb impact energy, as shown in FIGS. 5B, 6B, 7B. The tube 14 may be designed to deform the first pellets 16 and to move the second pellets 18 toward the axial ends 34, 36 when the first intermediate side 30 is deformed. The first intermediate side 30 may receive the impact and deform, transferring impact energy to the first pellets 16 and the second pellets 18. The first intermediate side 30 may apply a force on the first pellets 16 and the second pellets 18, deforming the first pellets 16 and pushing the second pellets 18 past the first pellets 16 and toward the axial ends 34, 36, as shown in FIG. 7B. The first pellets 16 and the second pellets 18 may be arranged to slide past each other upon receiving the force from the first intermediate side 30.

As shown in FIGS. 5A-5B, the energy absorbing device 10 may absorb energy from an impact. In FIGS. 5A-5B, an impactor 44 may simulate an impact from a low-speed (e.g., about 4 kilometers per hour) collision with a bumper from another vehicle. The impactor 44 may be sized to simulate the impact, e.g., the impactor 44 may have a width of between 16-24 inches and a mass of a vehicle curb weight (e.g., 1400-1700 kg). FIG. 5A shows the impactor 44 prior to impacting the energy absorbing device. The first pellets 16 may be arranged along the center axis A. FIG. 5B shows the impactor 44 upon impacting the energy absorbing device 10. As shown in FIG. 5A, the first pellets 16 are distributed among the second pellets 18.

Upon receiving the impactor 44, the first intermediate side 30 may deform, moving the first pellets 16 and the second pellets 18. The impactor 44 may deform the first intermediate side 30 toward the second intermediate side 32, pushing on the first pellets 16 and the second pellets 18. In FIG. 5B, the force from the impactor 44 does not deform the first pellets 16 or the second pellets 18, and the first pellets 16 and the second pellets 18 move toward the axial ends 34, 36.

Furthermore, FIG. 5B shows first pellets 16 and second pellets 18 that were hidden in the view of FIG. 5A and scattered from their respective alignment upon receiving the impactor 44. The energy from the impactor 44 moves the first pellets 16 and the second pellets 18 without deforming the first pellets 16 and the second pellets 18, allowing the energy absorbing device 10 to absorb energy from the impactor 44. Because the first pellet 16 and the second pellets 18 may not deform upon the impact with the impactor 44, the energy absorbing device 10 may have a high stiffness suitable for low-speed vehicle impacts. In this scenario, the energy absorbing device 10 reinforces the fascia 24 to resist plastic deformation of the fascia 24.

FIGS. 6A-6B illustrate a second impactor 46 impacting the energy absorbing device 10. The second impactor 46 may simulate an impact with a pedestrian leg at in a high-speed (e.g., 40 kph) collision. The second impactor 46 may be sized to simulate the impact, e.g., the second impactor 46 may have a width of 3.0-3.5 inches and a mass of about 13.8 kg. As shown in FIG. 6B, the second impactor 46 may deform the first intermediate side 30 and push the first pellets 16 and the second pellets 18 toward the axial ends 34, 36. The first pellets 16 and the second pellets 18 may move without deforming during the impact with the second impactor 46. In FIGS. 5A-6B, the impactor 44 and the second impactor 46 may simulate impacts that deform the intermediate side of the tube while not substantially deforming the first pellets 16 or the second pellets 18.

FIGS. 7A-7B illustrate a third impactor 48 impacting the energy absorbing device 10. The third impactor 48 may simulate an RCAR damageability impact mode, e.g., an impact with from a high-speed (e.g., 15 kph) collision with a bumper from another vehicle. As shown in FIG. 7B, when the third impactor 48 may deform the first intermediate side 30, the impact energy may transfer to the first pellets 16 and the second pellets 18 faster than the first pellets 16 and the second pellets 18 may move toward the axial ends 34, 36. The first pellets 16 may deform upon receiving the force from the third impactor 48, absorbing energy from the impact. Furthermore, the first pellets 16 may be scattered throughout the second pellets 18, as shown in FIG. 7B.

The impactor 44, second impactor 46, and third impactor 48 of FIGS. 5A-7B illustrate a plurality of impact scenarios in which the first pellets 16 move but do not deform (FIGS. 5A-6B) and in which the first pellets 16 deform (FIGS. 7A-7B) to absorb impact energy. The energy absorbing device 10 may absorb energy for impact scenarios that result in lower energy transfers, e.g., the low-speed vehicle collision of FIGS. 5A-5B and the pedestrian leg collision of FIGS. 6A-6B, without substantial deformation of the first pellets 16, and the energy absorbing device 10 may have a first stiffness. The energy absorbing device 10 may absorb energy for impact scenarios that result in higher energy transfers, e.g., the high-speed vehicle collision of FIGS. 7A-7B, that deform the first pellets 16, and the energy absorbing device 10 may have a second stiffness. Thus, the energy absorbing device 10 may have a variable stiffness for impacts having different energy transfers.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An energy absorbing device, comprising:
   a tube;
   a plurality of first pellets disposed in the tube;
   a plurality of second pellets disposed in the tube;
   wherein the first pellets are deformable relative to the second pellets and the first pellets and the second pellets are arranged to slide past each other.

2. The energy absorbing device of claim 1, wherein the plurality of first pellets is distributed throughout the plurality of second pellets.

3. The energy absorbing device of claim 1, wherein the first pellets and the second pellets are sphere-shaped.

4. The energy absorbing device of claim 1, wherein the first pellets are arranged in layers and the second pellets are arranged in layers, and the layers of the first pellets and the layers of the second pellets are arranged in alternative arrangement.

5. The energy absorbing device of claim 1, wherein the tube includes a pair of opposing lateral sides spaced from each other, and a pair of intermediate sides spaced from each other and extending between the lateral sides, and further comprising a plurality of tethers connecting the pair of opposing lateral sides.

6. The energy absorbing device of claim 1, wherein the first pellets are distributed along a length of the tube.

7. The energy absorbing device of claim 6, wherein the first pellets are arranged along a center axis extending along a length of the tube.

8. The energy absorbing device of claim 1, wherein the tube defines a volume, and the tube is designed to deform the first pellets when the tube is deformed to decrease the volume of the tube.

9. The energy absorbing device of claim 1, further comprising a plurality of third pellets, wherein the third pellets are deformable relative to the first pellets and the second pellets.

10. The energy absorbing device of claim 1, wherein a diameter of each of the first pellets is substantially equal to a diameter of each of the second pellets.

11. The energy absorbing device of claim 1, wherein the tube is substantially rectangularly shaped.

12. The energy absorbing device of claim 1, wherein the tube includes a pair of opposing axial ends, and the tube is designed to deform the first pellets and move the second pellets toward the axial ends when the tube is deformed.

13. The energy absorbing device of claim 1, wherein the first pellets are designed to deform and to allow the second pellets to move toward axial ends of the tube.

14. A bumper assembly, comprising:
    a bumper beam;
    a tube supported by the bumper beam;
    a plurality of first pellets disposed in the tube;
    a plurality of second pellets disposed in the tube;
    wherein the first pellets are deformable relative to the second pellets and the first pellets and the second pellets are arranged to slide past each other.

15. The bumper assembly of claim 14, wherein the plurality of first pellets is distributed throughout the plurality of second pellets.

16. The bumper assembly of claim 14, wherein the first pellets are arranged along a center axis extending along a length of the tube.

17. The bumper assembly of claim 14, wherein the tube defines a volume, the tube is designed to deform the first pellets when the tube is deformed to decrease the volume of the tube.

18. The bumper assembly of claim 14, wherein the tube includes a pair of opposing axial ends, and the tube is designed to deform the first pellets and move the second pellets toward the axial ends when the tube is deformed.

19. The bumper assembly of claim 14, further comprising a fascia spaced from the bumper beam, wherein the tube is disposed between the bumper beam and the fascia.

\* \* \* \* \*